US011515743B2

(12) United States Patent
Beyerl et al.

(10) Patent No.: US 11,515,743 B2
(45) Date of Patent: Nov. 29, 2022

(54) MOTOR WINDING DESIGN FOR AN ELECTRIC MOTOR

(71) Applicant: MILWAUKEE ELECTRIC TOOL CORPORATION, Brookfield, WI (US)

(72) Inventors: Andrew T. Beyerl, Pewaukee, WI (US); Derek J. Schwab, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 444 days.

(21) Appl. No.: 16/698,293

(22) Filed: Nov. 27, 2019

(65) Prior Publication Data

US 2020/0177034 A1 Jun. 4, 2020

Related U.S. Application Data

(60) Provisional application No. 62/772,934, filed on Nov. 29, 2018.

(51) Int. Cl.
*H02K 1/17* (2006.01)
*H02K 3/28* (2006.01)
*H02K 15/12* (2006.01)

(52) U.S. Cl.
CPC .............. *H02K 1/17* (2013.01); *H02K 3/28* (2013.01); *H02K 15/12* (2013.01)

(58) Field of Classification Search
CPC  H02K 1/17; H02K 3/28; H02K 15/12; H02K 2211/03; H02K 3/522; H02K 1/146; H02K 5/225; H02K 7/14
See application file for complete search history.

(56) References Cited

U.S. PATENT DOCUMENTS

| 1,326,341 | A | 12/1919 | Hellmund |
| 2,830,209 | A | 1/1956 | Fleckenstein |
| 2,993,136 | A | 7/1961 | Richer, Jr. et al. |
| 3,644,767 | A | 2/1972 | Kasargod et al. |
| 5,990,589 | A | 11/1999 | Ushikoshi |

(Continued)

FOREIGN PATENT DOCUMENTS

| CN | 2103215 U | 4/1992 |
| CN | 1378325 A | 11/2002 |

(Continued)

OTHER PUBLICATIONS

Received STIC search report from EIC 2800 searcher Vaisali Koppolu for claim 1 on Feb. 17, 2022. (Year: 2022).*

(Continued)

*Primary Examiner* — Emily P Pham
*Assistant Examiner* — Htet Z Kyaw
(74) *Attorney, Agent, or Firm* — Michael Best & Friedrich LLP

(57) ABSTRACT

An electric motor includes a stator assembly including a lamination stack, a printed circuit board assembly (PCBA), and a plurality of windings. The PCBA is coupled to the lamination stack at a first axial end of the stator assembly. The windings are wrapped about the lamination stack to form coils. Each winding includes crossover portions extending about a portion of a circumference of the stator assembly to connect pairs of opposite coils. The crossover portions are located at a second axial end of the stator assembly opposite the first axial end.

17 Claims, 6 Drawing Sheets

(56) References Cited

U.S. PATENT DOCUMENTS

| | | | |
|---|---|---|---|
| 6,515,393 B2 | 2/2003 | Asao et al. | |
| 6,914,356 B2 | 7/2005 | Yamamura et al. | |
| 6,998,750 B2 | 2/2006 | Anma et al. | |
| 7,227,291 B2 | 6/2007 | Jack et al. | |
| 7,262,429 B2 | 8/2007 | Taylor | |
| 7,557,483 B2 | 7/2009 | Yasuhara et al. | |
| 7,602,137 B2 | 10/2009 | Du et al. | |
| 7,714,474 B2 | 5/2010 | Koshikawa et al. | |
| 7,888,829 B2 | 2/2011 | Koike et al. | |
| 7,923,872 B2* | 4/2011 | Sahara | H02K 3/522 310/194 |
| 8,035,263 B2 | 10/2011 | Kienzler et al. | |
| 8,183,728 B2 | 5/2012 | Schaflein et al. | |
| 8,193,677 B2 | 6/2012 | Murakami et al. | |
| 8,450,898 B2 | 5/2013 | Sears et al. | |
| 8,618,711 B2 | 12/2013 | Shirai | |
| 8,823,236 B2 | 9/2014 | Ishikawa et al. | |
| 9,154,009 B2 | 10/2015 | Alemu | |
| 9,225,216 B2 | 12/2015 | Dietl et al. | |
| 9,270,146 B2 | 2/2016 | Chai et al. | |
| 9,318,932 B2 | 4/2016 | Purohit et al. | |
| 9,362,796 B2 | 6/2016 | Tomita et al. | |
| 9,450,471 B2 | 9/2016 | Mergener et al. | |
| 9,450,472 B2 | 9/2016 | Hatfield et al. | |
| 9,472,988 B2 | 10/2016 | Sonoda et al. | |
| 9,608,493 B2 | 3/2017 | Nonoguchi et al. | |
| 9,742,234 B2 | 8/2017 | Hashimoto et al. | |
| 9,748,810 B2 | 8/2017 | Okinaga et al. | |
| 9,774,229 B1 | 9/2017 | Mergener et al. | |
| 9,800,123 B2 | 10/2017 | Zhang et al. | |
| 9,812,930 B2 | 11/2017 | Purohit et al. | |
| 9,819,241 B2 | 11/2017 | Smith et al. | |
| 9,919,903 B2 | 3/2018 | Patrick et al. | |
| 9,948,162 B2 | 4/2018 | Nagahama et al. | |
| 9,954,417 B2 | 4/2018 | Mergener et al. | |
| 10,027,196 B2 | 7/2018 | Yoshida et al. | |
| 10,056,806 B2* | 8/2018 | Hatfield | H02K 7/145 |
| 2005/0189843 A1* | 9/2005 | Imai | H02K 1/165 310/257 |
| 2006/0091745 A1 | 5/2006 | Klappenbach et al. | |
| 2010/0072840 A1* | 3/2010 | Sahara | H02K 3/522 310/71 |
| 2013/0169105 A1* | 7/2013 | Chang | H02K 1/146 310/216.072 |
| 2013/0270934 A1* | 10/2013 | Smith | H02K 7/145 310/50 |
| 2013/0313927 A1 | 11/2013 | Laber et al. | |
| 2014/0368070 A1 | 12/2014 | Park et al. | |
| 2015/0280497 A1* | 10/2015 | Qin | H02K 1/165 310/216.055 |
| 2016/0226339 A1 | 8/2016 | Niwa et al. | |
| 2016/0301276 A1 | 10/2016 | Saki et al. | |
| 2017/0163118 A1 | 6/2017 | Kimpara | |
| 2017/0288499 A1 | 10/2017 | Beyerl et al. | |
| 2017/0317547 A1 | 11/2017 | Bolz | |
| 2017/0324311 A1 | 11/2017 | Tsutsui | |
| 2017/0366060 A1 | 12/2017 | Haberkom et al. | |
| 2018/0013329 A1 | 1/2018 | Aoyama | |
| 2018/0166932 A1 | 6/2018 | Desai | |
| 2018/0294688 A1 | 10/2018 | Smith et al. | |
| 2018/0301965 A1 | 10/2018 | Matsuda et al. | |

FOREIGN PATENT DOCUMENTS

| | | |
|---|---|---|
| CN | 102624122 A | 8/2012 |
| CN | 102931799 A | 2/2013 |
| CN | 203707549 U | 7/2014 |
| CN | 206323241 U | 7/2017 |
| CN | 206323245 U | 7/2017 |
| CN | 206341108 U | 7/2017 |
| CN | 207638418 U | 7/2018 |
| DE | 1097542 B | 1/1961 |
| DE | 1159556 | 12/1963 |
| DE | 2015018 A1 | 10/1971 |
| DE | 202005011721 U1 | 12/2006 |
| DE | 102012024581 A1 | 6/2014 |
| DE | 202015008207 U1 | 1/2016 |
| DE | 102016213710 A1 | 2/2018 |
| EP | 1111757 A2 | 6/2001 |
| EP | 2978105 A1 | 1/2016 |
| EP | 3340440 B1 | 7/2020 |
| JP | 3988617 B2 | 10/2007 |
| WO | 2000048292 A1 | 8/2000 |
| WO | 2009047053 A1 | 4/2009 |
| WO | 2016062813 A1 | 4/2016 |
| WO | 2016184720 A1 | 11/2016 |
| WO | 2018176888 A1 | 10/2018 |

OTHER PUBLICATIONS

Received STIC search report from EIC 2800 searcher Emily P Huston for claim 7 on Apr. 1, 2022. (Year: 2022).*
Received STIC search report from EIC 2800 searcher Vaisali Koppolu for claim 8 on Feb. 18, 2022. (Year: 2022).*
Received STIC search report from EIC 2800 searcher Jyothsna Kondamudi for claim 15 on Feb. 25, 2022. (Year: 2022).*
International Search Report and Written Opinion for Application No. PCT/US2019/063681 dated Mar. 24, 2020 (11 pages).
Extended European Search Report for Application No. 19888298.7 dated Aug. 11, 2022 (9 pages).

* cited by examiner

US 11,515,743 B2

MOTOR WINDING DESIGN FOR AN ELECTRIC MOTOR

CROSS-REFERENCE TO RELATED APPLICATIONS

This application claims priority to U.S. Provisional Patent Application No. 62/772,934, filed on Nov. 29, 2018, the entire contents of which is incorporated herein by reference.

FIELD OF THE INVENTION

The present invention relates to tools, such as power tools, and more particularly to power tools including an electric motor having windings wound on a stator.

BACKGROUND OF THE INVENTION

Tools, such as power tools, can include an electric motor having a stator to generate a magnetic field. The stator may include windings wound in slots to form coils, and terminals electrically connecting the coils to a power source.

SUMMARY OF THE INVENTION

In one construction, an electric motor includes a stator assembly including a lamination stack, a printed circuit board assembly (PCBA), and a plurality of windings. The PCBA is coupled to the lamination stack at a first axial end of the stator assembly. The windings are wrapped about the lamination stack to form coils. Each winding includes crossover portions extending about a portion of a circumference of the stator assembly to connect pairs of opposite coils. The crossover portions are located at a second axial end of the stator assembly opposite the first axial end.

In another construction, an electric motor includes a stator assembly including a lamination stack having an outer surface, a printed circuit board assembly (PCBA), a plurality of windings wrapped about the lamination stack to form coils, and terminals coupled to the outer surface of the lamination stack. The PCBA is coupled to the lamination stack at a first axial end of the stator assembly. Each winding includes crossover portions located at a second axial end of the stator assembly opposite the first axial end. The crossover portions extend about a portion of a circumference of the stator assembly to connect pairs of opposite coils. Each terminal extending longitudinally between the first axial end and the second axial end to electrically connect the crossover portions to the PCBA.

In another construction, an electric motor includes a stator assembly including a lamination stack having an outer surface, a plurality of windings wrapped about the stator assembly to form coils, and terminals coupled to the outer surface of the lamination stack. Each winding includes crossover portions extending about a portion of a circumference of the stator assembly to connect pairs of opposite coils. The terminals extend longitudinally between opposite first and second axial ends of the lamination stack, from a connection portion configured to electrically connect to a power source, to a tang configured to electrically connect to at least one of the crossover portions.

Other aspects of the application will become apparent by consideration of the detailed description and accompanying drawings.

Figure 1:
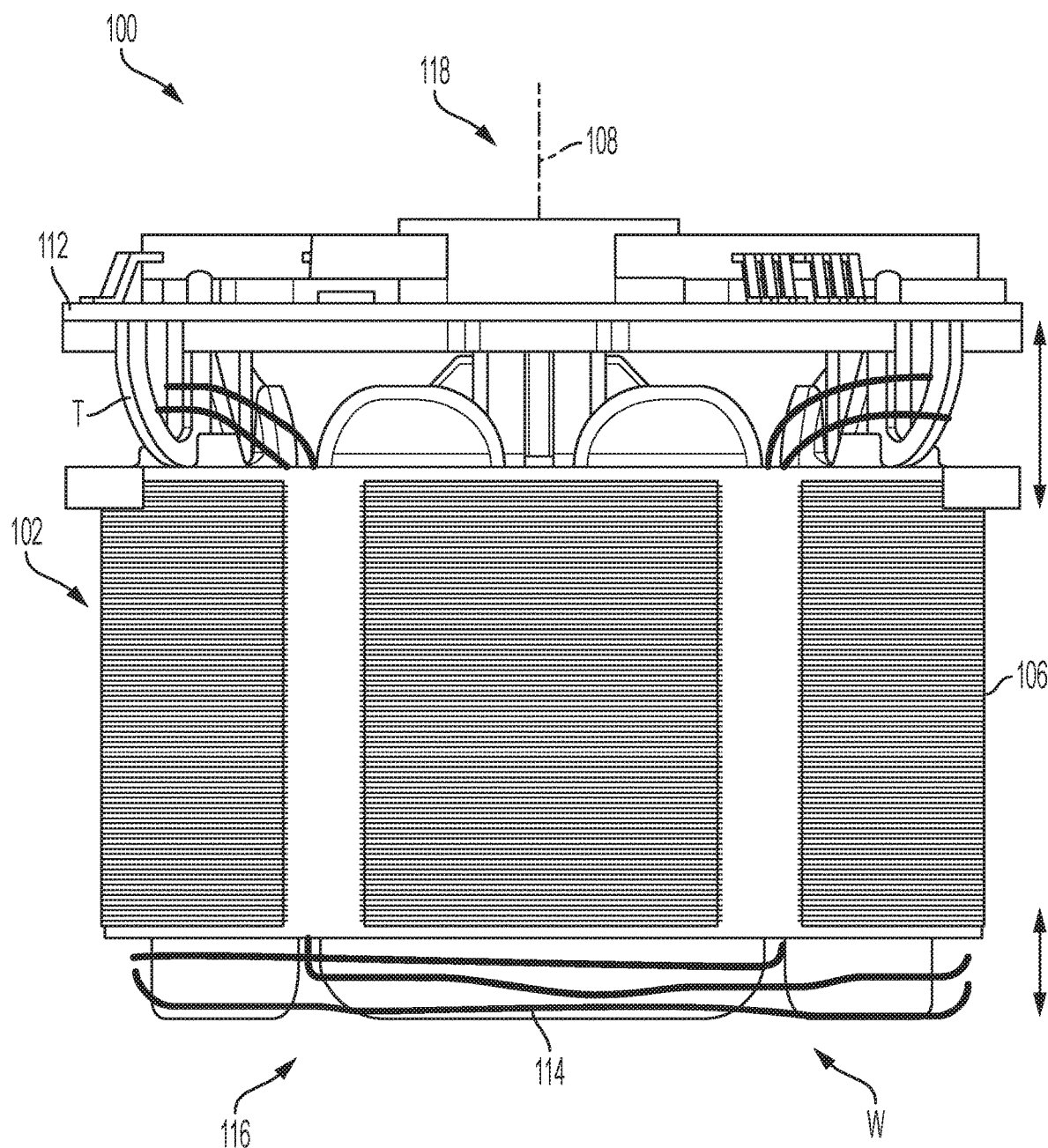
FIG. 1 is a front view of an electric motor according to an embodiment of the invention.

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

FIGS. 1, 2, and 4-7 illustrate an electric motor 100 for use in various different tools, such as power tools (e.g., rotary hammers, pipe threaders, cutting tools, etc.), outdoor tools (e.g., trimmers, pole saws, blowers, etc.), and other electrical devices (e.g., motorized devices, etc.).

The electric motor 100 is configured as a brushless DC motor. In some embodiments, the motor 100 may receive power from an on-board power source (e.g., a battery, not shown). The battery may include any of a number of different nominal voltages (e.g., 12V, 18V, etc.), and may be configured having any of a number of different chemistries (e.g., lithium-ion, nickel-cadmium, etc.). Alternatively, the motor 100 may be powered by a remote power source (e.g., a household electrical outlet) through a power cord. The motor 100 includes a substantially cylindrical stator assembly 102 operable to produce a magnetic field, and a rotor assembly (not shown) supported for rotation with respect to the stator assembly 102.

The stator assembly 102 includes a lamination stack 106 formed from a plurality of laminations that are stacked along a rotational axis 108. In the illustrated embodiment, six stator teeth TT1, TT2 (FIG. 2) extend inwardly in a generally radial direction from an annular yoke 110 of the lamination stack 106. Pairs of adjacent teeth TT1, TT2 form slots S1, S2 therebetween. Although the stator assembly 102 of the illustrated embodiment includes an annular yoke 110, in other embodiments (not shown) the yoke may be formed in other, non-round shapes (e.g., square, hexagonal, etc.).

Figure 7:
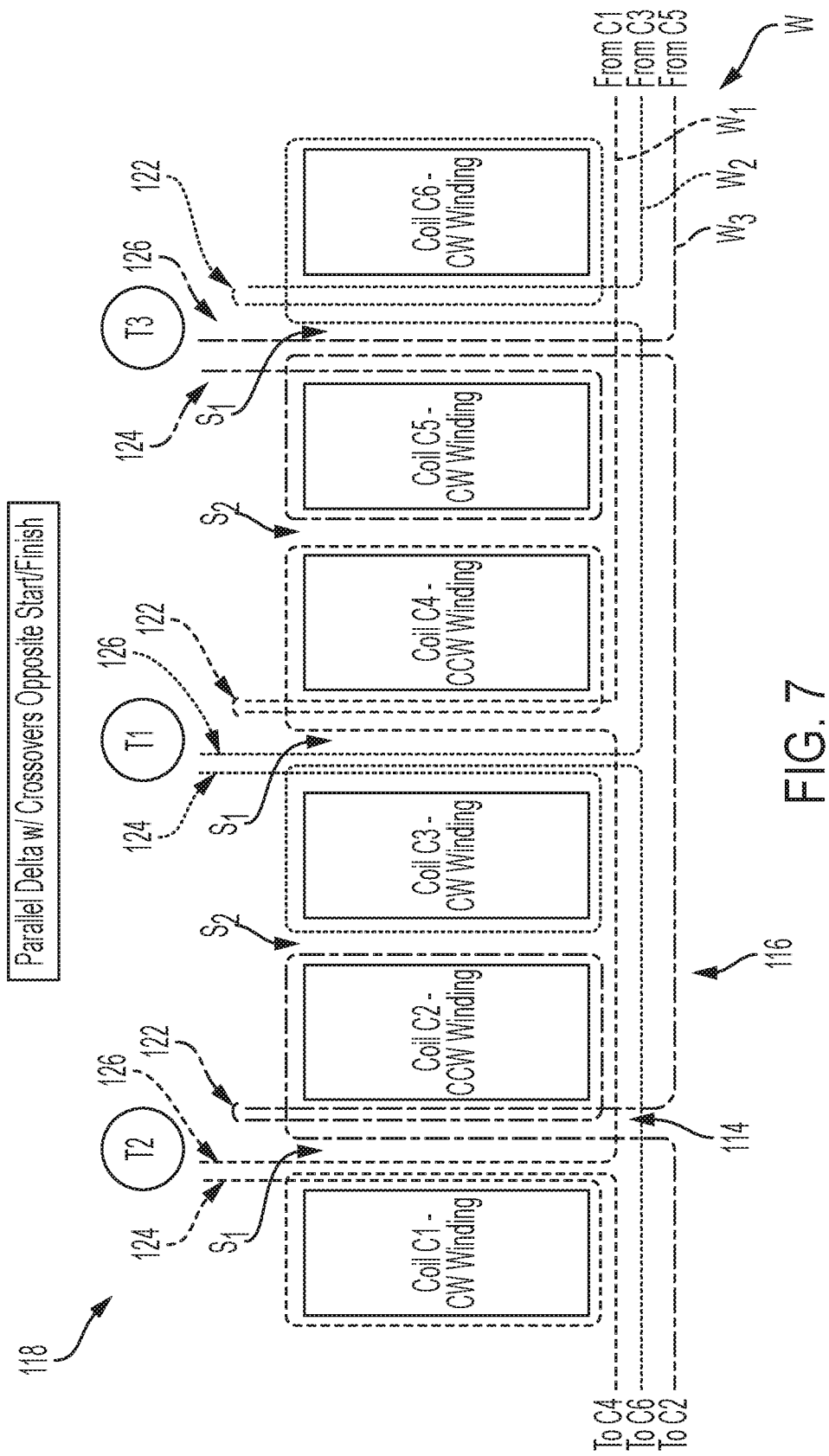
FIG. 7 is a schematic diagram of the winding configuration of FIG. 4.

Windings W (FIG. 1) are routed through the slots S1, S2 (FIG. 2) and wound about the respective teeth TT1, TT2 to form coils C1, C2, C3, C4, C5, and C6 (FIG. 7). The windings W are electrically connected to terminals T (FIG. 1) (e.g., by direct contact), which in turn are electrically connected to a PCBA 112 (e.g., a hall effect sensor board) that selectively supplies current to the coils C1-C6 via the terminals T.

Figure 2:
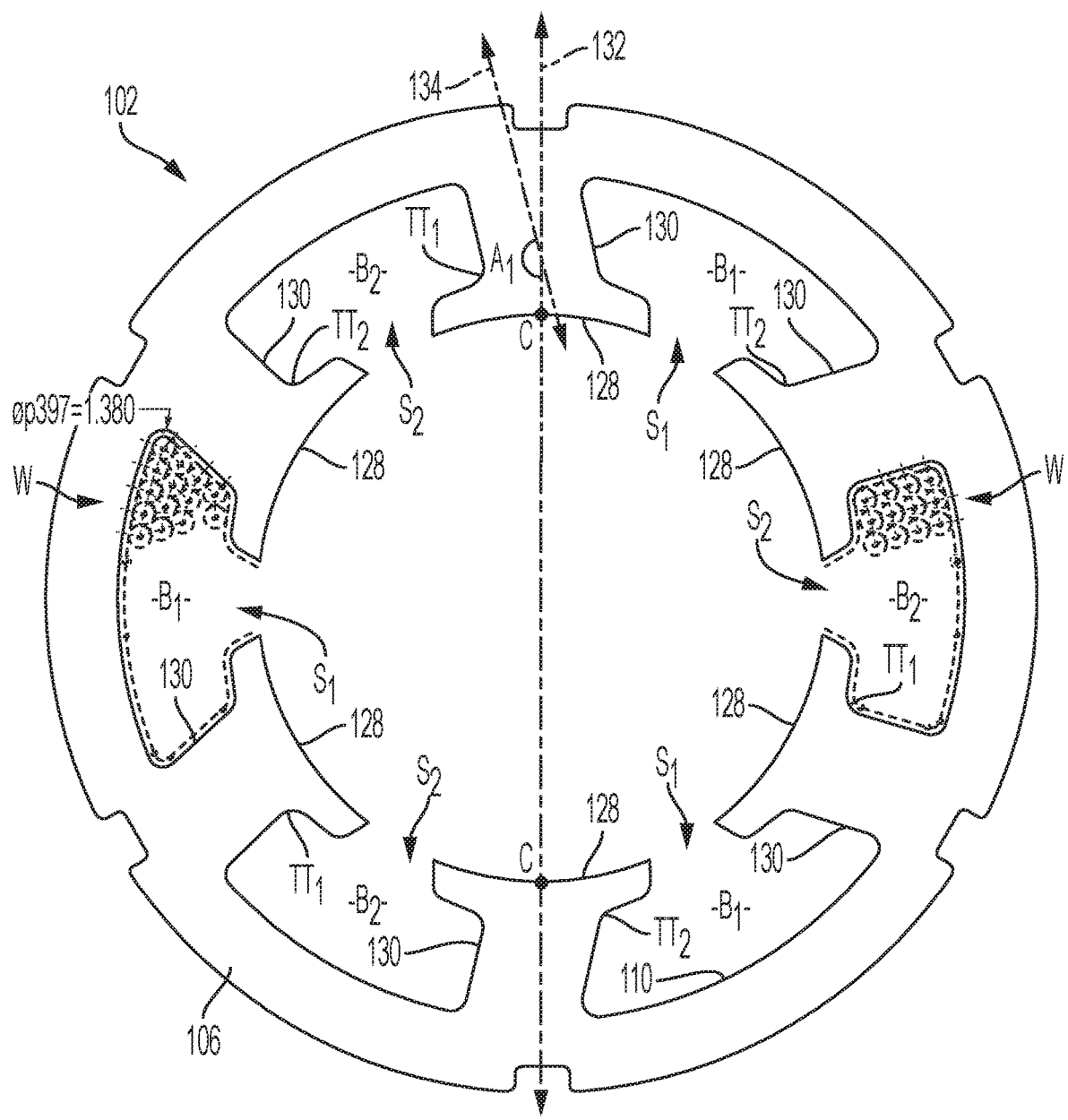
FIG. 2 is a schematic cross-sectional view of a stator assembly of the electric motor of FIG. 1.
Figure 3:
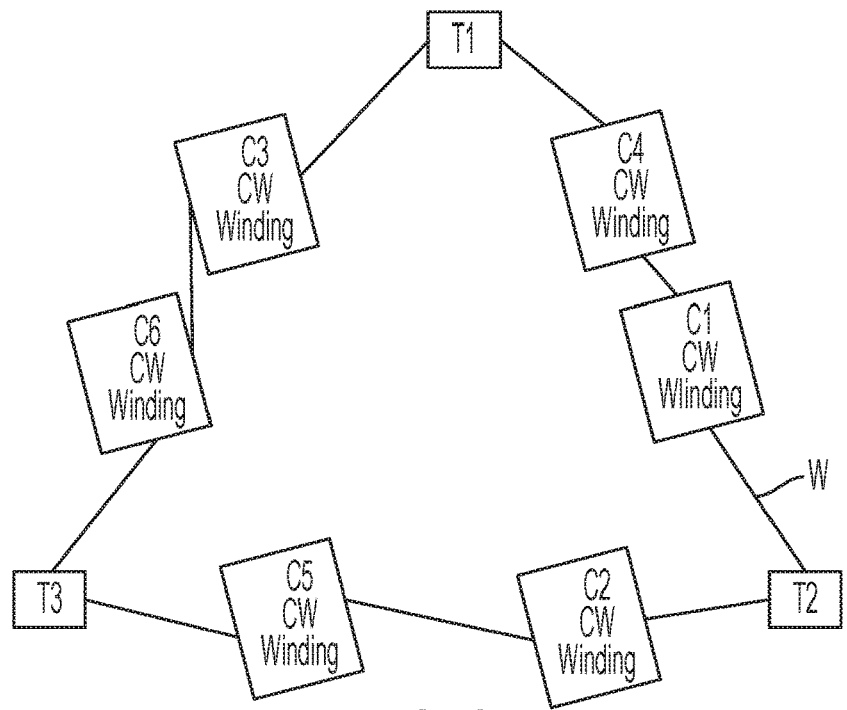
FIG. 3 is a schematic diagram of a prior art winding configuration.
Figure 4:
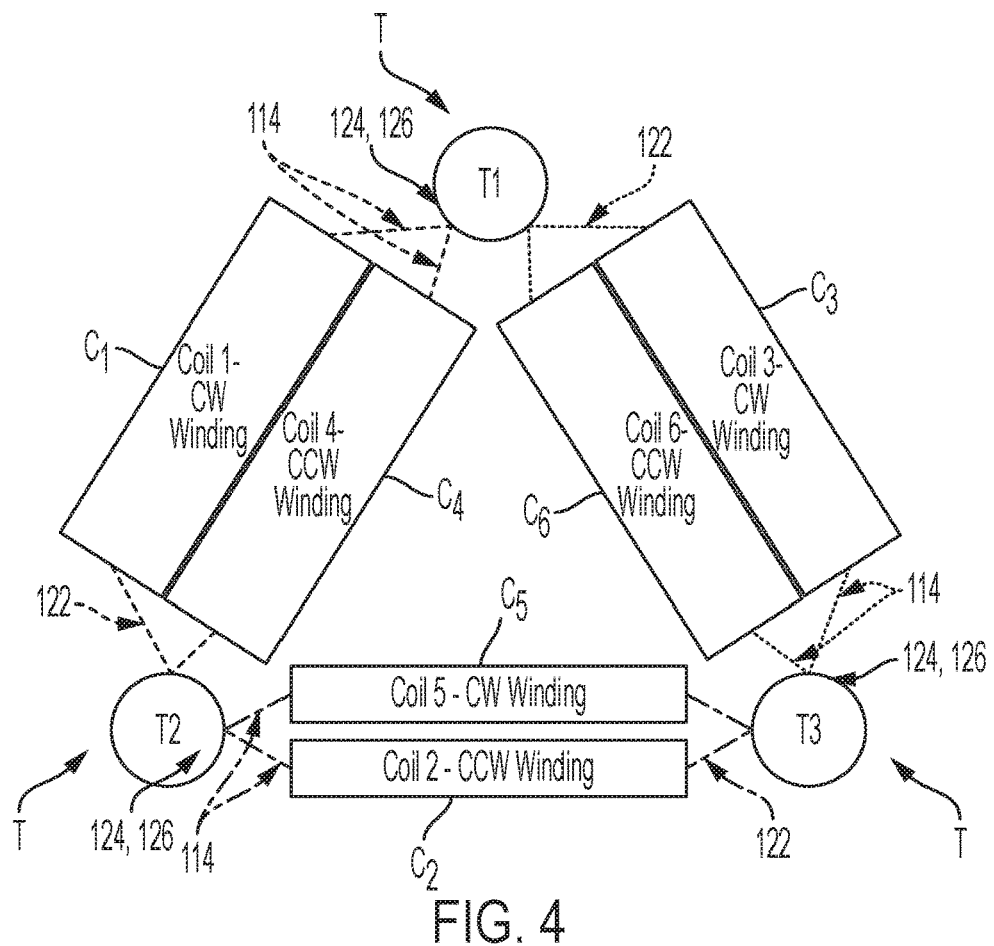
FIG. 4 is a schematic diagram of a winding configuration of the electric motor of FIG. 1.

In some prior art designs as illustrated by FIG. 3, the windings are routed in a series configuration in which a single winding W extends from a first terminal to a first tooth and forms a first coil, then extends from the first coil to a second, opposite tooth and forms a second coil, and then extends from the second coil to a second terminal and attaches thereto. In the proposed electric motor 100 embodied in FIGS. 1, 2, and 4-7, the windings W are configured in a parallel delta configuration (FIG. 4). Specifically, each individual winding W extends between pairs of electrically opposite coils C1-C4, C2-C5, and C3-C6, respectively (FIG. 4). Each pair of opposite coils C1-C4, C2-C5, and C3-C6 is connected in parallel between respective terminals T.

Since the coils of each pair C1-C4, C2-C5, and C3-C6 are located opposite one another, portions of the windings W extend around the circumference of the stator assembly 102 to connect the coils of each pair C1-C4, C2-C5, and C3-C6. These portions of the windings W are referred to herein as crossovers 114 (FIG. 1). In the illustrated embodiment, the crossovers 114 are routed along a fan side 116 of the electric motor 100, and the PCBA 112 is coupled to the motor 100 at a board side 118 of the electric motor 100 opposite the fan side 116. In the illustrated embodiment, the terminals T are coupled to the stator assembly 102 at the board side 118, opposite the crossovers 114. In some embodiments, the electric motor 100 further includes a fan (not shown) rotated by the rotor assembly (not shown), and the fan is located adjacent the fan side 116.

Figure 5:
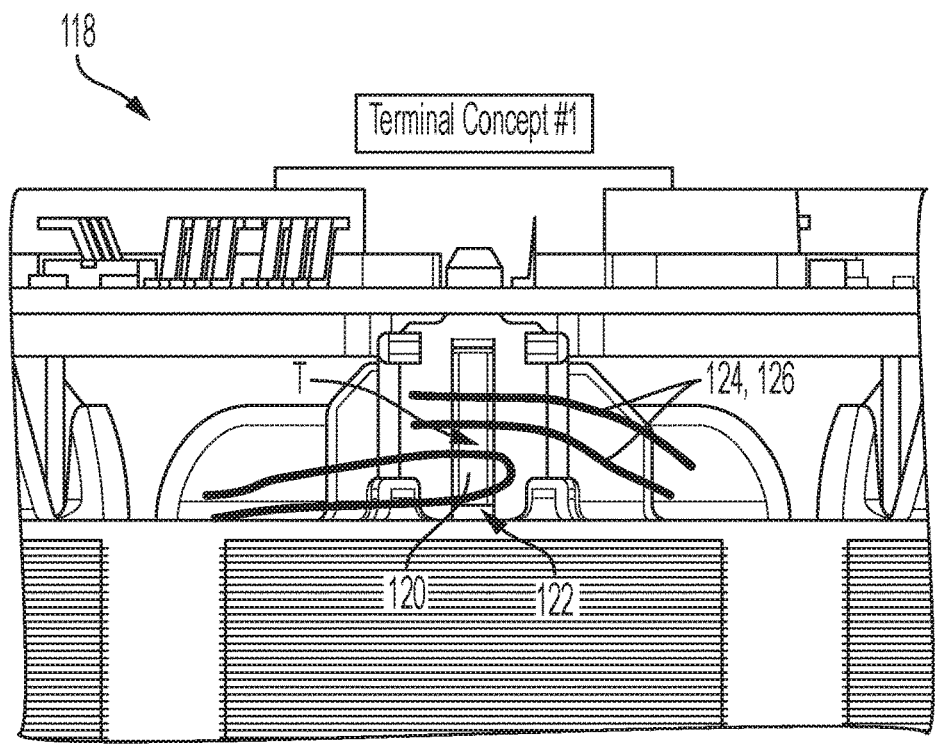
FIG. 5 is a detail view of a portion of the electric motor of FIG. 1.
Figure 6:
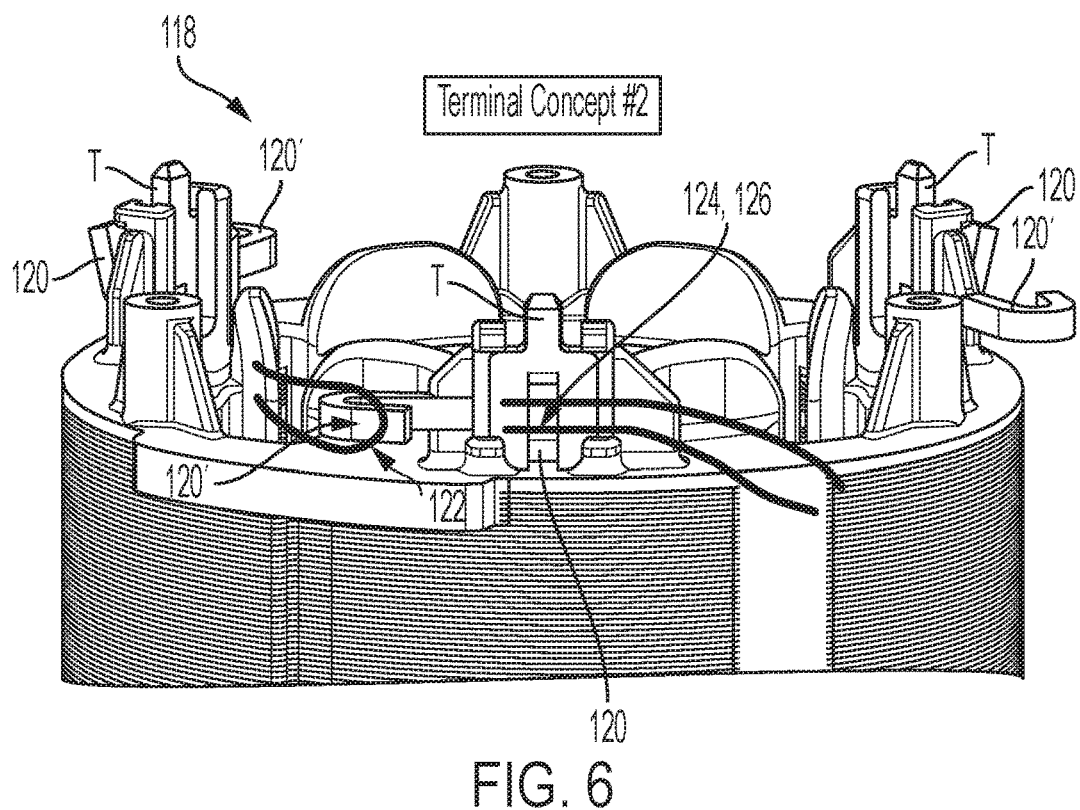
FIG. 6 is another detail view of a portion of the electric motor of FIG. 1.

Each terminal T includes a hook portion or tang 120 (FIG. 5), and the windings W are wrapped around the tangs 120 to form the electrical connections between the windings W and the terminals T. This allows the winding configuration to be implemented automatically by a needle winder. The winding configuration also permits the needle winder to wind three of the coils C1-C6 at one time, which can improve the throughput of the winding process. Referring to FIG. 5, the tang 120 extends outward from the stator assembly 102 in a radial direction, and a looped lead 122 of the windings W may be wound around the tang 120 to form the electrical connection between the windings W and the terminal T. In some embodiments, in addition to the tang 120, a second tang 120' may extend away from the terminal T in a circumferential direction as illustrated in FIG. 6.

The windings W may include a first winding W1, a second winding W2, and a third winding W3, each wound about the stator assembly 102 in the configuration illustrated by FIG. 7. Likewise, the terminals T may include a first terminal T1, a second terminal T2, and a third terminal T3. Each of the windings W1, W2, and W3 includes a respective start lead 124 and a respective finish lead 126 that each connect to a respective terminal T1, T2, or T3.

For example, as shown in FIG. 7, the first winding W1 begins at the start lead 124 at the second terminal T2, passes longitudinally through the slot S1, and wraps about the stator assembly 102 to form the first coil C1. The first winding W1 exits the first coil C1 at the fan side 116 and extends about the circumference of the stator assembly 102 (via the crossover 114) toward the location of fourth coil C4. The first winding W1 then extends longitudinally through the slot S1 adjacent the fourth coil C4 to form the looped lead 122 about the tang 120 (FIG. 5) of the first terminal T1, thereby electrically connecting the first winding W1 to the first terminal T1. The first winding W1 then reverses course, passing back through the slot S1 in the longitudinal direction, and wrapping around the stator assembly 102 to form the fourth coil C4. The first winding W1 exits the fourth coil C4 on the fan side 116, and travels back around the circumference of the stator assembly 102 (via the crossover 114) toward the first coil C1. The first winding W1 then passes longitudinally through the slot S1 adjacent the first coil C1, and terminates at the finish lead 126, which connects to the terminal T2. In this way, the first and fourth coils C1, C4 are connected in parallel between the first and second terminals T1, T2. The second and third windings W2, W3 are wound in a manner similar to the configuration described with respect to W1, as illustrated in FIG. 7.

With continued reference to FIG. 7, the start and finish leads 124, 126 and the looped leads 122 for each winding W1, W2, and W3 all pass longitudinally through slots S1 between the fan side 116 and the board side 118. As a result, each of the slots S1 contains more conductors than each of the slots S2. To account for these extra conductors, the lamination stack 106 is provided with the slots S1 that are larger in area than the slots S2, as will be discussed in further detail below. The larger area of the slots S1 helps to avoid uneven slot fill in the stator assembly 102.

With reference to FIG. 2, each tooth TT1, TT2 of the lamination stack 106 includes a crown portion 128 and a body portion 130 that connects the crown portion 128 to the yoke 110. The crown portions 128 are equally spaced from one another in a circumferential direction. However, the body portions 130 of the teeth TT1, TT2 are alternately offset or skewed in a radial direction, so that each successive tooth TT1, TT2 alternately skews toward the clockwise direction or toward the counter clockwise direction. For example, the teeth TT1 skew slightly clockwise in the circumferential direction, while the teeth TT2 skew slightly counter clockwise in the circumferential direction.

For purposes of illustration, a dividing line 132 divides the lamination stack 106 into equal halves and extends through a center point C of the crown portion 128 of two opposing teeth TT1 and TT2. A longitudinal axis 134 extends through the body portion 130 of the tooth TT1 and intersects the dividing line 132. The dividing line 132 forms an angle A1 with the longitudinal axis 134 of tooth TT1. In the illustrated construction, the angle A1 is approximately 166 degrees. Accordingly, tooth TT1 is skewed or offset at an angle A1 of approximately 166 degrees toward the clockwise direction. Likewise, each of the remaining teeth TT1 are also offset at angles A1 (not shown) of approximately 166 degrees toward the clockwise direction, while the alternating teeth TT2 are offset at corresponding angles A2 (not shown) of approximately 166 degrees toward the counter clockwise direction. In other embodiments, the angles A1, A2 may be greater than 90 degrees and less than 180 degrees.

Because the teeth TT1, TT2 are alternately skewed or offset, the slots S1, S2 defined between adjacent pairs of teeth TT1, TT2 define two different slot areas B1 and B2. The slot area B1 is larger than the slot area B2. In the illustrated embodiment, slot area B1 is approximately 70 millimeters squared (mm2), while slot area B2 is approximately 60 mm2. In other embodiments (not shown), the two slot areas B1, B2 may be larger or smaller than 70 mm2 and 60 mm2, respectively, and may vary as a function of the angles A1, A2. The two different slot areas B1 and B2 help to avoid uneven slot fill when different numbers of windings W are alternately applied to the teeth TT1, TT2.

Figure 8:
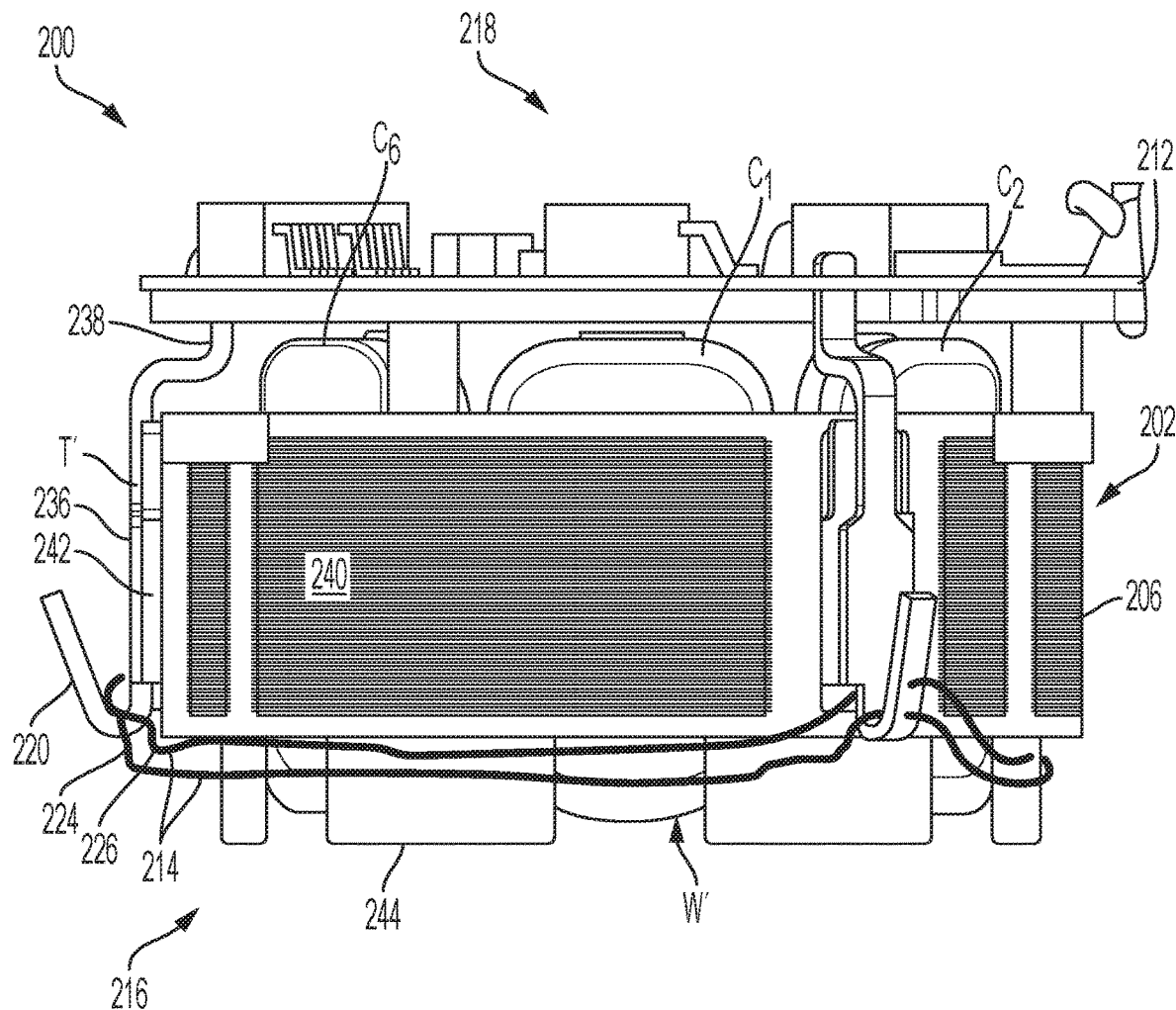
FIG. 8 is a front view of an electric motor according to another embodiment of the invention.

FIG. 8 illustrates another embodiment of an electric motor 200 similar to the electric motor 100 described above, with like features shown with reference numerals plus "100," or, prime "(')" in the case of alphabetical reference numerals. The electric motor 200 includes stator assembly 202 operable to produce a magnetic field, and a rotor assembly (not shown) supported for rotation with respect to the stator assembly 202. The stator assembly 202 likewise includes a lamination stack 206 and windings W' routed through the slots S1, S2 to form coils C1', C2', C3', C4', C5', and C6'. The windings W' are electrically connected to terminals T', which in turn are electrically connected to a PCBA 212 (e.g., a hall effect sensor board) that selectively supplies current to the coils C1'-C6' via the terminals T'.

In the illustrated embodiment, the windings W' are configured in a parallel delta configuration wherein each individual winding W' extends between pairs of electrically opposite coils C1'-C4', C2'-C5', and C3'-C6', respectively. Each pair of opposite coils C1'-C4', C2'-C5', and C3'-C6' is connected in parallel between respective terminals T'. Crossovers 214 are routed along a fan side 216 of the electric motor 200, and a PCBA 212 is coupled to the electric motor 200 at a board side 218 of the motor 200 opposite the fan side 216.

The terminals T' of the electric motor 200 are elongated such that the terminals T' extend longitudinally along an outer surface 240 of the lamination stack 206 between the board side 218 and the fan side 216. Each elongated terminal T' includes a longitudinal portion 236 having a connecting portion 238 electrically coupled to the PCBA 212 at the board side 218 of the electric motor 200. The longitudinal portion 236 extends along the outer surface 240 of the lamination stack 206 from the connecting portion 238 to a hook portion or tang 220 located adjacent the fan side 216. Each tang 220 extends along the outer surface 240 of the lamination stack 206 toward the fan side 216, and then bends backward toward the board side 218 at a location adjacent an axial end of the lamination stack 206. Start and finish leads 224, 226 of the windings W' connect to the terminals T' at the tangs 220 adjacent the fan side 216. Similarly, looped leads 222 of the windings W' also connect to the tangs 220 adjacent the fan side 216. The elongated terminals T' electrically connect the coils C1'-C6' to the PCBA 212.

This configuration allows for significant stack-up reduction to minimize the length of the motor 200 and reduce material and process costs, and also allows the winding configuration to be implemented automatically by a needle winder. The winding configuration also permits the needle winder to wind three of the coils C1'-C6' at one time, which can improve the throughput of the winding process. Moreover, the elongated terminals T' bridge the length of the stator assembly 202 between the PCBA 212 at the board side 218 and the crossovers 214 at the fan side 216. Thus, the elongated terminals eliminate the need for the start and finish leads 224, 226 and the looped leads 222 to pass through the slots S1' as described above with respect to the electric motor 100. This reduces the overall length of the windings W' and thereby further reduces material costs.

In the illustrated embodiment, the electric motor 200 includes three elongated terminals T' that are spaced apart from one another in the circumferential direction at generally equal intervals. Each terminal T' is attached to the outer surface 240 of the lamination stack 206 via an attachment member 242. The stator assembly 202 also includes an insulating member 244 formed of an insulative material (e.g., plastic) that insulates the windings W' from the lamination stack 206. In the illustrated embodiment, the attachment members 242 are separate elements formed separately from the insulating member 244. In other embodiments (not shown), the attachment members 242 may be formed as portions of the insulating member 244, so that the elongated terminals T' are secured to the electric motor 200 via the insulating member 244.

Although the application has been described in detail with reference to certain preferred embodiments, variations and modifications exist within the scope and spirit of one or more independent aspects of the application as described.

What is claimed is:

1. An electric motor comprising:
a stator assembly including
a lamination stack including an annular yoke and a plurality of teeth extending inwardly from the yoke, the teeth defining slots therebetween, the slots comprising a plurality of first slots and a plurality of second slots, the first slots and the second slots being formed in an alternating sequence in a circumferential direction of the stator assembly,
a printed circuit board assembly (PCBA) coupled to the lamination stack at a first axial end of the stator assembly,
terminals electrically connected to the PCBA at the first axial end; and
a plurality of windings wrapped about the lamination stack to form coils, each winding including crossover portions extending about a portion of a circumference of the stator assembly to connect pairs of opposite coils, the windings including leads that contact the terminals to electrically connect the coils to the PCBA, the leads extending longitudinally between the first axial end and a second axial end of the stator assembly opposite the first axial end to connect the terminals to the crossover portions;
wherein the crossover portions are located at the second axial end of the stator assembly; and
wherein the leads extend through the first slots only.

2. The electric motor of claim 1, further including a fan located adjacent the second axial end.

3. The electric motor of claim 1, wherein the stator assembly includes the terminals electrically connected to the PCBA at the first axial end, each terminal including a tang, and wherein the windings include looped leads that are wrapped about the tangs to electrically connect the coils to the PCBA.

4. The electric motor of claim 1, wherein each tooth includes a crown portion and a body portion connecting the crown portion to the yoke, and wherein the body portions of each tooth are skewed away from a radial direction in a circumferential direction, and wherein the body portions of adjacent teeth alternatingly skew toward and away from one another in the circumferential direction.

5. The electric motor of claim 1, wherein each first slot has a first slot area, and each second slot has a second slot area, the first slot area being larger than the second slot area.

6. An electric motor comprising:
a stator assembly including
a lamination stack having an outer surface,
a printed circuit board assembly (PCBA) is coupled to the lamination stack at a first axial end of the stator assembly,
a plurality of windings wrapped about the lamination stack to form coils, each winding including crossover portions located at a second axial end of the stator assembly opposite the first axial end, the crossover portions extending about a portion of a circumference of the stator assembly to connect pairs of opposite coils, and
terminals coupled to the outer surface of the lamination stack, each terminal formed separately from the windings and extending longitudinally between the first axial end and the second axial end to electrically connect the crossover portions to the PCBA;
wherein each terminal includes a connection portion that intersects a portion of the PCBA.

7. The electric motor of claim 6, further including a fan located adjacent the second axial end.

8. The electric motor of claim 6, wherein the stator assembly includes attachment members that couple each respective terminal to the outer surface of the lamination stack.

9. The electric motor of claim 6, wherein the lamination stack includes an annular yoke and a plurality of teeth extending inwardly from the yoke, the teeth defining slots therebetween.

10. The electric motor of claim 6, wherein each terminal including a tang located adjacent the second axial end, and wherein the windings include leads that contact the tangs to electrically connect the coils to the PCBA.

11. The electric motor of claim 10, wherein each tang bends toward the first axial end.

12. The electric motor of claim 6, wherein the windings are configured in a parallel delta configuration.

13. An electric motor comprising:
a stator assembly including
a lamination stack having an outer surface, a plurality of windings wrapped about the stator assembly to form coils, each winding including crossover portions extending about a portion of a circumference of the stator assembly to connect pairs of opposite coils, and
terminals coupled to the outer surface of the lamination stack, the terminals formed separately from the windings and extending longitudinally between opposite first and second axial ends of the lamination stack, from a connection portion configured to electrically connect to a power source, to a tang configured to electrically connect to at least one of the crossover portions; and
a printed circuit board assembly (PCBA) coupled to the lamination stack at the first axial end;
wherein the connection portions are electrically connected to the PCBA and intersect a portion of the PCBA.

14. The electric motor of claim 13, wherein the connection portions are located proximate the first axial end, and the tangs and the windings are located proximate the second axial end.

15. The electric motor of claim 13, further including a fan located adjacent the second axial end.

16. The electric motor of claim 13, wherein the stator assembly includes attachment members that couple each respective terminal to the outer surface of the lamination stack.

17. The electric motor of claim 13, wherein the windings are configured in a parallel delta configuration.

* * * * *